Figure 2:
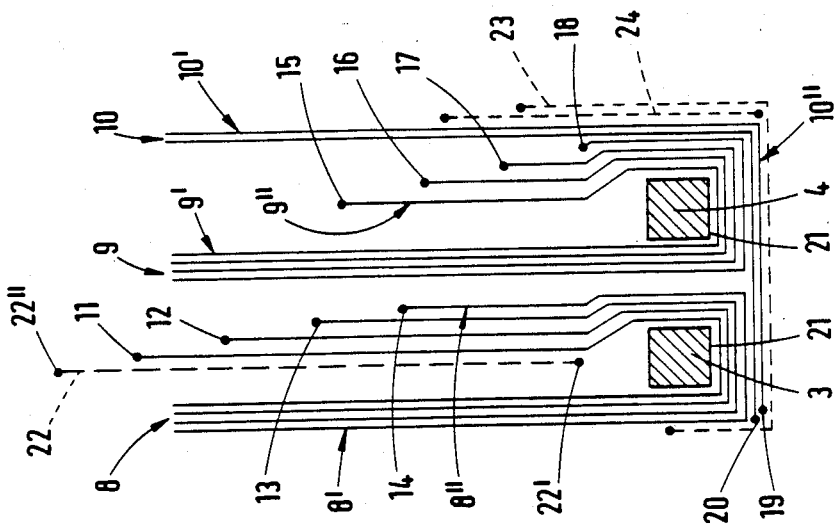

United States Patent [19]

Lamock

[11] Patent Number: 4,890,660
[45] Date of Patent: Jan. 2, 1990

[54] PNEUMATIC TIRE HAVING A REVERSED BEAD TIE-IN

[75] Inventor: André Lamock, Fauvillers, Belgium

[73] Assignee: The Goodyear Tire & Rubber Company, Akron, Ohio

[21] Appl. No.: 296,914

[22] Filed: Jan. 12, 1989

Related U.S. Application Data

[63] Continuation of Ser. No. 132,228, Dec. 11, 1987, abandoned.

[51] Int. Cl.$^4$ .................. B60C 15/05; B60C 09/06
[52] U.S. Cl. .................................. 152/545; 152/554; 152/555; 152/559
[58] Field of Search ............... 152/545, 554, 546, 517, 152/542, 543, 555, 559

[56] References Cited

U.S. PATENT DOCUMENTS

| | | | |
|---|---|---|---|
| 2,257,646 | 9/1941 | Pierce | 152/556 |
| 2,943,663 | 7/1960 | Antonson | 152/534 |
| 2,994,358 | 8/1961 | Trevaskis | 152/540 |
| 3,486,547 | 12/1969 | Powers | 152/555 X |
| 3,826,297 | 7/1974 | Alderfer | 152/542 |
| 3,982,580 | 9/1976 | Inoue et al. | 152/527 |
| 4,246,949 | 1/1981 | Kawasaki et al. | 152/541 |
| 4,263,957 | 4/1981 | Abe | 152/545 |
| 4,340,105 | 7/1982 | Abe | 152/545 |
| 4,342,351 | 8/1982 | Kuroda | 152/545 X |
| 4,349,062 | 9/1982 | Tsurunaga et al. | 152/556 |

Primary Examiner—Raymond Hoch
Attorney, Agent, or Firm—L. R. Drayer

[57] ABSTRACT

The invention relates generally to pneumatic tires and in particular to pneumatic tires for heavy duty use comprising a diagonal ply carcass and two bead regions (1) each reinforced by two axially spaced apart bead cores (3,4). The present invention is characterized in that the radially outermost ply ending (11) of the first set (8) of plies is located at a height which is greater than the height of the radially outermost ply ending (15) of the second set (9) of plies. The tire construction according to the present invention provides particularly durable bead regions (1) and sidewall regions (2), the stiffness in the head regions (1) and sidewall regions (2) decreasing gradually from the axially inner side towards the axially outer side of the tire.

2 Claims, 1 Drawing Sheet

PNEUMATIC TIRE HAVING A REVERSED BEAD TIE-IN

This is a continuation of patent application Ser. No. 132,228 filed Dec. 11, 1987, now abandoned.

This invention relates generally to pneumatic tires and in particular to pneumatic tires for heavy duty use comprising a diagonal ply carcass and two bead regions each reinforced by two axially spaced apart bead cores.

Diagonal ply carcass tires for heavy duty use are frequently used under heavy load conditions which place the components within a tire under severe stress. The bead and sidewall regions of such tires are particularly subject to large deformations which cause cyclical stresses in these regions of the tire. These cyclical deformations in turn can lead to a fatigue failure of the reinforced composites and reinforcing components used in the bead and sidewall area.

The applicants have found a tire construction with particularly durable bead and sidewall regions.

The pneumatic tire of the present invention is characterized in that the radially outermost ply ending of a first set of plies is located at a height which is greater than the height of the radially outermost ply ending of a second set of plies, the height of a ply ending being the distance as measured from a reference point P which is located at the intersection of a plane A perpendicular to the tire's axis of rotation passing through the center of the axially outermost bead core and the radially inner surface of the bead region.

The tire construction according to the present invention provides a stiffness in the bead and sidewall regions which decreases gradually from the axially inner side towards the axially outer side of the tire.

Figure 1:
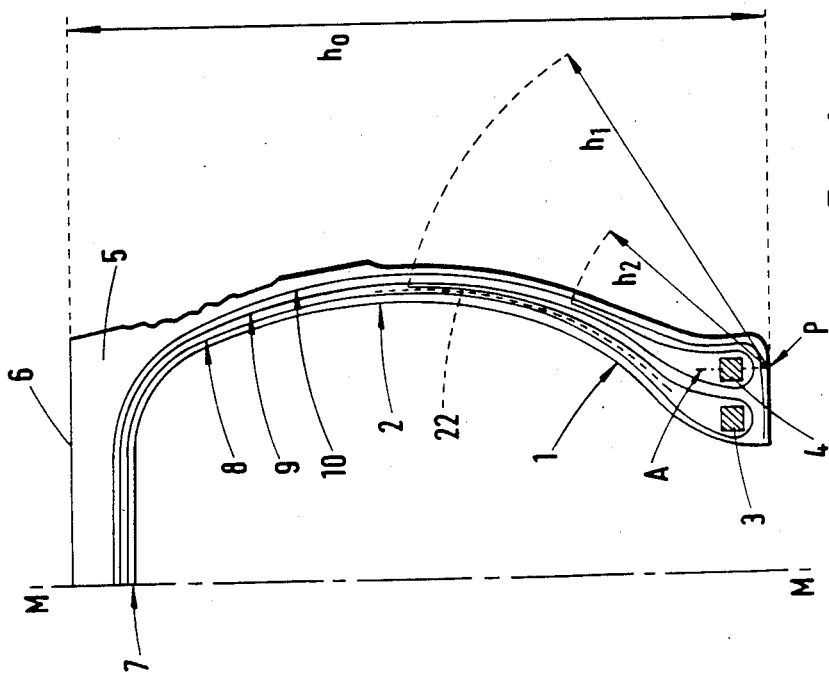

The invention will now be described with reference to the accompanying drawings in which FIG. 1 is a schematic representation of a radial cross-sectional view of a bead and sidewall region of a tire according to the present invention, and FIG. 2 is a schematic plan view of a bead and sidewall region of a tire according to the present invention.

Throughout the specification the terms "axial" and "axially" relate to displacements along the axis of rotation of the tire, and the terms "radial" and "radially" refer to displacements perpendicular to the axis of rotation of the tire. The terms "axially inner" and "axially outer" refer to axial positions relative to the mid-circumferential plane M—M. The mid-circumferential plane M—M is a plane normal to the axis of rotation and which is located midway between the bead regions.

With reference to FIG. 1, there is illustrated a schematic representation of a cross-section through the bead region 1 and sidewall region 2 of a diagonal carcass tire for heavy duty use. It is understood that a tire according to the present invention is symmetrical with respect to the mid-circumferential plane M—M. The tire comprises a pair of annular bead regions 1 for engaging with the bead seats and flanges of a wheel rim. The bead region 1 comprises two axially spaced apart and substantially inextensible annular bead cores 3,4. The bead cores 3,4 as shown in the embodiment of FIG. 1, consist of metal filaments which are disposed in a rubber insulation, and each bead core has a generally square cross-section. The invention is not limited to the use of such bead cores 3,4 and is equally applicable to bead cores of a different construction and cross-section. A sidewall region 2 extends radially outwardly from each bead region 1 into the crown region 5 of the tire. The crown region 5 has a ground contacting tread 6 extending circumferentially thereabout.

The carcass 7 comprises three sets 8,9,10 of plies of at least one textile ply each with their main portions 8',9',10' extending between the bead regions 1 and their edge portions 8",9",10" being wrapped around the bead cores 3,4. The plies of the first set 8 are wrapped around the axially inner bead core 3 from the inside towards the outside of the tire and the plies of the second set 9 are wrapped around the axially outer bead core 4 from the inside towards the outside of the tire and the plies of the third set 10 are wrapped around both bead cores 3,4 from the outside towards the inside of the tire.

While the term 'wrapped around' is used throughout this specification to describe the anchoring of the sets 8,9,10 of carcass plies in the bead regions of the tire, it is understood that this term also refers to the situation illustrated in FIG. 1 by the third set of plies 10 where the edge portions 10" do not form a turn up portion and are anchored radially inwardly of the bead cores 3,4.

It is well known in the tire art that the number of plies that are used as carcass plies depends on the size of the tire and the load that the tire must be capable of typically vary between 2 and 4.

The material of the cords that compose the textile plies of the carcass may be selected from one or more of the conventional materials that are used in tires, such as nylon, flexten, polyester, etc. It has been found that nylon is a particularly suitable material for the first, second and third sets 8,9,10 of plies.

The illustration of the invention on FIG. 1, for clarity reasons, only shows one ply ending for each set 8,9,10 of plies, namely the ending of the ply of each set that has the highest ply ending, referred to hereafter as the radially outermost ply ending.

It can be seen that the radially outermost ply ending 11 of the first set 8 of plies is located at a height $h_1$ which is greater than the height $h_2$ of the radially outermost ply ending 15 of the second set of plies 9.

FIG. 1 further shows a reinforcing layer 22 which is disposed between the main portions 8' of the first set 8 of plies and their edge portions 8". This layer will be further described below with reference to the embodiment shown in FIG. 2.

Referring now more particularly to FIG. 2 the beads of the tires of the present invention are illustrated in a schematic way to show the disposition of the carcass ply endings of a preferred embodiment of the invention, in which the first and second sets 8,9 of plies comprise 4 plies each and in which the third set of plies 10 comprises 2 plies. The heights of the ply endings 11,12,13,14 of the first set 8 of plies are comprised between 0.40 and 0.60 times the height of the tire cross-section $h_o$, while the heights of the ply endings 15,16,17,18 of the second set 9 of plies are comprised between 0.25 and 0.45 times the height of the tire cross-section $h_o$. The endings of the plies in each of the first and second sets 8,9 of plies are staggered and are arranged to terminate successively radially outwardly further as each ply ending is located axially closer to the inside of the tire, thereby decreasing the stiffness in the bead region 1 and sidewall region 2 gradually from the axially inner side to the axially outer side of the tire.

The height of the tire cross-section $h_o$ is the distance from the reference point P to the tire's radially outermost point on its surface measured along a line which is parallel to the mid-circumferential plane M—M.

In a further preferred embodiment of the invention illustrated in FIG. 2, the radially outermost ply ending 15 of the second set 9 of plies is located at a height which is comprised between the two radially innermost ply endings 13,14 of the first set 8 of plies.

The ply endings 19,20 of the third set 10 of plies are located in the axially inner portion of the bead region 1 and are located at a height which is radially inwardly of the radially innermost edge 21 of the bead cores 3,4, in other words, the plies of the third set 10 of plies terminate radially inwardly of the bead cores 3,4 without a turn up portion.

The angle that the reinforcing cords of the carcass plies make with the mid-circumferential plane M—M in a diagonal ply carcass construction is generally not constant, but varies from the bead region to the crown region, the angle being higher in the sidewall region 2 than in the crown region 5. Preferably, for the present invention, the angles that the cords of the carcass plies of all three sets 8,9,10 make with mid-circumferential plane M—M of the tire is between 36 degrees and 42 degrees in the crown region 5 and between 56 degrees and 62 degrees in the sidewall region 2.

The bead region 1 and sidewall region 2 may further be reinforced and rigidified by a reinforcing layer 22. This reinforcing layer 22 preferably comprises at least one ply of textile reinforcing cords.

In the embodiment shown, the reinforcing layer 22 is sandwiched between the main (so-called "down") portions 8' of the plies of the first set 8 of plies and the turn up portions 8" of these same plies. The reinforcing layer 22 extends radially outwardly from a radially inner edge 22', which is disposed radially inwardly of the radially outermost ply ending 15 of the second set 9 of plies to a radially outer edge 22" which is disposed radially outwardly of the radially outermost ply ending 11 of the first set 8 of plies.

It has been found that nylon is a particularly suitable material for the cords of the reinforcing layer 22. The invention, however, is not limited to the use of nylon for the cords of the reinforcing layer 22 but equally applies to tires in which another fabric material is used for the plies of the reinforcing layer 22. Preferably the angle of the cords of the reinforcing layer 22 with respect to the mid-circumferential plane M—M of the tire is between 20 degrees and 35 degrees.

The bead region 1 of the tire illustrated in FIG. 2, further comprises at least one, preferably two, additional rubber layers 23,24, generally referred to as chafers, extending into the axially outer side of the bead region 1, generally referred to as the heel of the bead region 1. In the embodiment shown in FIG. 2, the bead region 1 of the tire comprises two additional rubber layers 23,24.

I claim:

1. A pneumatic tire for heavy duty use comprising a bias ply carcass and two bead regions, each bead region having two bead cores, the carcass comprises at least three sets of at least two textile plies each, each carcass ply having a main portion extending between the bead regions, in each said bead region the plies of the first set are wrapped around the axially inner bead core from an adjacent axially inner most side towards an adjacent axially outermost side of the tire and the plies of the second set are wrapped around the axially outer bead core from the an adjacent axially innermost side towards an adjacent axially outermost side of the tire and the plies of the third set are wrapped around both bead cores from the an adjacent axially outermost side towards an adjacent axially innermost side of the tire, the endings of the plies in each of the first and second sets of plies are staggered and are arranged to terminate successively radially outwardly further as each ply ending is located axially closer to an adjacent axially innermost side of the tire, the radially outermost ply ending of the first set of plies is located at a height which is greater than the height of the radially outermost ply ending of the second set of plies and the radially outermost ply ending of the second set of plies being located at a height which is between the heights of the two radially innermost ply endings of the first set of plies, the height of the ply endings of the first set of plies being between 0.40 and 0.60 times the height of the tire cross-section, and the height of the ply endings of the second set of plies being between 0.25 and 0.45 times the height of the tire cross-section, and the height of a ply ending being the distance as measured from a reference point which is located at the intersection of a plane perpendicular to the tire's axis of rotation passing through the center of the axially outermost bead core and the radially inner surface of the bead region, a reinforcing layer comprising at least one non-folded ply of textile reinforcing cords being sandwiched between the fold of the ply of the first set of plies having the radially outermost ply ending, said reinforcing layer extending radially outwardly from a radially inner edge which is disposed radially inwardly of the radially outermost ply ending of the second set of plies to a radially outer edge which is disposed radially outwardly of the radially outermost ply ending of the first set of plies.

2. A pneumatic tire for heavy duty use according to claim 1, wherein the angle of the cords of the carcass plies in the crown region of the tire with respect to the mid-circumferential plane of the tire is between 36 degrees and 42 degrees.

* * * * *